(12) United States Patent
Owen, Sr. et al.

(10) Patent No.: US 7,931,506 B2
(45) Date of Patent: Apr. 26, 2011

(54) WIRING SYSTEM AND CONNECTOR THEREFOR

(75) Inventors: Robert H. Owen, Sr., Columbia City, IN (US); John A. Forish, Huntington, IN (US); Mark Molinaro, Leo, IN (US); Antonio Nuevo, Brussels (BE)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 12/719,498

(22) Filed: Mar. 8, 2010

(65) Prior Publication Data

US 2010/0159726 A1 Jun. 24, 2010

Related U.S. Application Data

(62) Division of application No. 11/872,207, filed on Oct. 15, 2007, now Pat. No. 7,690,950.

(60) Provisional application No. 60/884,368, filed on Jan. 10, 2007.

(51) Int. Cl.
  *H01R 24/00* (2011.01)
(52) U.S. Cl. ............... 439/699.2; 439/622; 439/672; 439/76.2; 362/252
(58) Field of Classification Search ............... 439/622, 439/699.2, 672, 76.2; 362/252
  See application file for complete search history.

(56) References Cited

U.S. PATENT DOCUMENTS

| | | | |
|---|---|---|---|
| 2,875,421 A | 2/1959 | Jordan | |
| 3,137,488 A | 6/1964 | Holzhause | |
| 3,717,758 A | 2/1973 | Willis | |
| 3,748,462 A | 7/1973 | Newman | |
| 4,280,062 A | 7/1981 | Miller et al. | |
| 4,516,054 A | 5/1985 | Shikama et al. | |
| 4,573,754 A * | 3/1986 | Hill | 439/280 |
| 4,577,917 A | 3/1986 | Nashimoto et al. | |
| 4,772,209 A | 9/1988 | Muncey | |
| 4,940,422 A | 7/1990 | Forish et al. | |
| 4,958,429 A | 9/1990 | Forish et al. | |
| 5,000,702 A * | 3/1991 | Forish et al. | 439/699.2 |
| 5,080,594 A | 1/1992 | Swinford | |
| 5,087,213 A * | 2/1992 | Drapcho et al. | 439/672 |
| 5,306,173 A * | 4/1994 | Suzuki | 439/336 |
| 5,442,332 A | 8/1995 | Hughes | |
| 5,443,389 A | 8/1995 | Hughes | |
| 5,514,009 A | 5/1996 | Hughes | |
| 5,639,246 A * | 6/1997 | Holmes | 439/35 |
| 5,876,235 A * | 3/1999 | Yoshigi | 439/384 |
| 5,954,538 A | 9/1999 | Huang | |
| 6,080,019 A * | 6/2000 | Coushaine | 439/611 |
| 6,139,334 A * | 10/2000 | Forish et al. | 439/56 |
| 6,247,973 B1 | 6/2001 | Chawa et al. | |
| 6,270,235 B1 | 8/2001 | Coushaine | |
| 6,341,875 B1 * | 1/2002 | Chu | 362/249.06 |
| 6,394,849 B2 | 5/2002 | Kasai | |
| 6,520,790 B2 * | 2/2003 | Okamoto | 439/336 |
| 6,635,824 B1 | 10/2003 | Oka | |
| 7,033,209 B2 | 4/2006 | Swiatek et al. | |
| 7,147,521 B2 | 12/2006 | Molinaro et al. | |
| 2003/0179584 A1 | 9/2003 | Pond et al. | |
| 2004/0140750 A1 | 7/2004 | Behr et al. | |
| 2004/0257810 A1 | 12/2004 | Garcia et al. | |

\* cited by examiner

*Primary Examiner* — Truc T Nguyen
(74) *Attorney, Agent, or Firm* — Robert L. Stearns; Dickinson Wright, PLLC

(57) ABSTRACT

A wiring system that allows easy installation into a vehicle and includes a connector that allows functional signals to perform a function in a connector while passing through the connector.

12 Claims, 7 Drawing Sheets

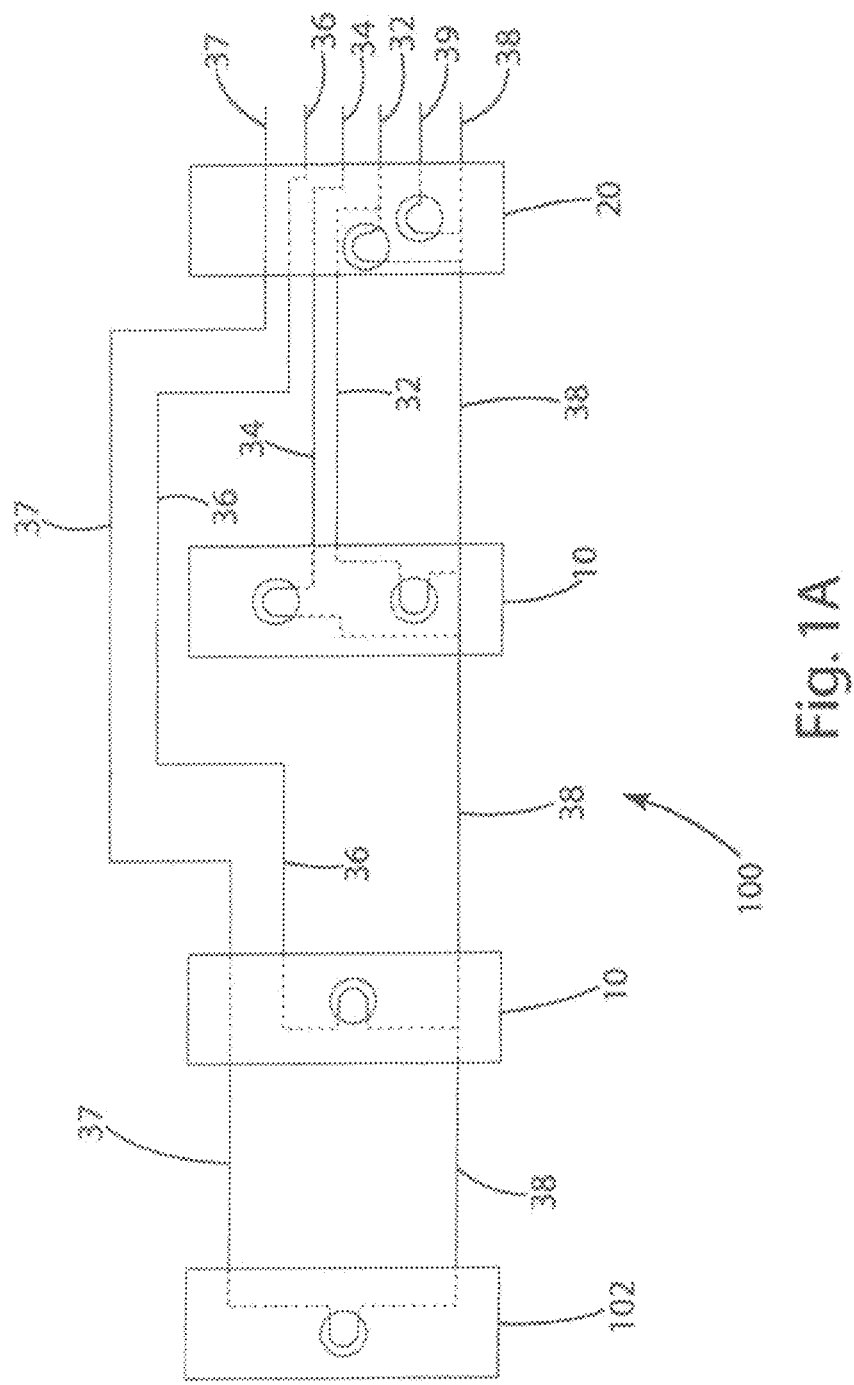

WIRING SYSTEM AND CONNECTOR THEREFOR

CROSS REFERENCE TO RELATED APPLICATIONS

This application is a divisional application of U.S. application Ser. No. 11/872,207, filed Oct. 15, 2007 now U.S. Pat. No. 7,690,950, which claims the benefit of U.S. Provisional Application Ser. No. 60/884,368, filed Jan. 10, 2007, which are incorporated herein by reference in their entirety.

BACKGROUND OF THE INVENTION

1. Technical Field

This invention is related to wiring harness assemblies and, in particular, wiring connectors having opposing terminals that allow power to pass from one end of the connector assembly to the other end.

2. Related Art

Many vehicles, industrial applications, and commercial applications use a variety of wiring harnesses. These wiring harnesses are not only labor intensive to install, but are typically specialized for a specific application. As wiring harnesses are specialized for specific applications, each wiring harness design is typically different, making it difficult to create a uniform wiring harness, even for powering traditional applications such as the lighting system of a vehicle. For example, each vehicle may have different lighting locations, different distances between lighting locations, as well as different routes along which the wiring assemblies must run thereby varying lengths of the wiring assembly as well as distances between terminals in the wiring assembly. Traditionally, each terminal connected to the wiring assembly needed to be spliced and then taped or epoxied into the wiring. Given the different locations, such as different locations between models of vehicles, and the numerous numbers of splices followed by taping or epoxy at different locations on different wiring assemblies, it has been difficult, if not impossible, to automate the assembly of wiring harnesses. Therefore, traditionally the assembly of wiring harnesses and the later installation of wiring harnesses into vehicles has been extremely labor intensive.

In assembling a vehicle, generally a main wiring harness is assembled from which various smaller wiring harnesses run various items that receive electrical power, provide feedback, or control relays or devices. The wiring harness when installed is substantially complete due to the necessity of prior splicing and taping or using shrink tube or epoxy to seal out moisture. Substantially complete wiring assemblies may include numerous legs to extend in different directions, making them difficult to assemble into the vehicle.

Modern vehicles have a multitude of electrical items which provide power to the wiring harness, receive electrical power from the wiring harness, control devices along the wiring harness, or provide feedback regarding various vehicle operating parameters. As manufacturers increasingly add new electronic devices and controls to vehicles, including everything from navigational systems to cooling fans in seats and from smart cruise controls to back-up alarm systems, the associated wiring harnesses for vehicles have become more complex. Therefore, the assembly time required for manufacturing the wiring harness of a vehicle as well as installing the wiring harness in a vehicle has substantially increased. Exemplary vehicles that are continually adding electrical components and functions as well as various additional controls including automobiles, airplanes, boats, trucks, and other forms of vehicles, as well as industrial and commercial equipment. For example, many vehicles used in agricultural, construction, earth moving, and mining have added GPS navigational systems which can even provide an autopilot function or be controlled by external software. Many stationary industrial and commercial machines are increasingly complex and have added numerous wiring harnesses as control systems have become more complex and provide more feedback and monitoring options. Therefore, the assembly required for almost any application having a wiring harness has become increasingly complex and requires additional assembly and installation time. As an example of an application in which wiring harnesses have become more complex in vehicles, and in particular automobiles, is a taillight and the various associated functions including turn, brake, tail, reverse, and side light functions. Traditionally, a few wires ran from the fuse panel individually to each taillight. As the price of copper and other materials used in wiring assemblies steadily increased, manufacturers looked to reduce costs by joining functions along the wiring assembly. Furthermore, wiring each functional device to its associated control and power device individually within the automobile caused a very labor intensive assembly process of the automobile. Therefore, wiring harnesses were used to simplify the wiring of the vehicle and minimize assembly time by bundling many wires. Originally wiring harnesses were fairly simple with a couple splices and were easy to assembly and install. However, as additional electrical equipment and controls have continually been added to the number of wires and wiring splices has significantly increased, thereby increasing the labor in manufacturing the wiring harness, the material used to create the wiring harness, and the installation time.

Therefore, there is a need for a wiring harness including new wiring harness connectors that reduce assembly time and the materials used in the manufacturing of wiring harnesses. There is also a need for a wiring harness that includes less splices and is easy to assemble through automated methods and has increased reliability. Furthermore, there is a need for a wiring harness assembly that allows for standard components to be used in a particular vehicle or application and thereby reduces cost in designing and assembling the wiring harness.

SUMMARY OF THE INVENTION

In view of the above, the present invention is directed to a wiring system including a harness assembly and connectors of the wiring harness assembly that increase the ease of assembly and reliability while reducing the material and labor cost to assemble the wiring harness.

The present invention uses connectors that minimize the number of splices required for the wiring harness assembly, and thereby reduce the amount of material used to assemble the wiring harness, such as tape, shrink tubing, epoxy, epoxy filled shrink tubing, and copper. The connectors also minimize installation labor costs by allowing easier assembly and automation of the assembly process. Furthermore, plug connectors allow easier assembly through standard components.

The wiring harness includes at least one of two connectors developed to simplify wiring harnesses. The first connector is a junction socket connector. The junction socket connector allows easy assembly of two connectors by providing a traditional plug between two portions of the wiring harness. The junction connector, instead of being a terminal end to the wiring as most bulb sockets are, allows certain functional wires including at least a common or ground wire to pass through the body of the connector. Instead of splicing, for example a light socket into the wiring harness, the junction connector allows a plug and play system during assembly with the necessary wires passing through the body of the junction connector, thereby eliminating most wiring splices. All wires may pass through the junction connector or some of the wires may terminate within the junction connector. The second connector is generally a pass-through connector, designed similar to the junction connector, but without the plug option. The pass-through connector has cable or wire seals on each side of the connector but no plug as in the junction connector.

Each of the connectors allows an electrical item to easily act as a functional item as well as an electrical conduit to other electrical items. Therefore, the number of splices and assembly time and materials required to produce the wiring assembly is reduced. These connectors also allow the wiring assembly for most vehicles and other applications to be broken into component parts allowing assembly of much more complex wiring assemblies with minimal customization. Therefore an assembler may choose wiring harnesses having standardized length and standardized number of wires to plug the standard connectors thereby eliminating almost all of the splicing in assembling the wiring harness.

A connector constructed in accordance with one aspect of the invention includes a body providing a socket and a first and second cable seal area. Further, a functional electrical assembly is configured to fit within the socket. A first pin and second pin extend from the first cable seal area to the second cable seal area and, the first and second pins are in electrical communication with the functional electrical assembly.

In accordance with another aspect of the invention, a wiring system is provided. The wiring system includes at least one junction connector having a body providing a plug; a socket for receiving a functional electrical assembly, and at least one cable outlet. A plurality of pins extend from the plug to the at least one cable outlet, wherein at least one of the plurality of pins is in electrical communication with the functional electrical assembly.

In accordance with yet another aspect of the invention, a wiring system includes at least one pass-through connector having a body with a first cable seal area having at least three cavities configured to receive wires and a socket for receiving a functional electrical assembly. A first pin extends from a first cavity selected from the at least three cavities through the body and to a second cavity selected from the at least three cavities, and wherein the first pin is in electrical communication with the functional electrical assembly. A second pin extends from a third cavity selected from the at least three cavities and to the functional electrical assembly and wherein the first pin is a ground pin and the second pin is in electrical communication with the functional electrical assembly and communicates a functional signal.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIG. 1a shows a schematic view of the wiring assembly in FIG. 1;

DETAILED DESCRIPTION OF PREFERRED EMBODIMENTS

Figure 1:
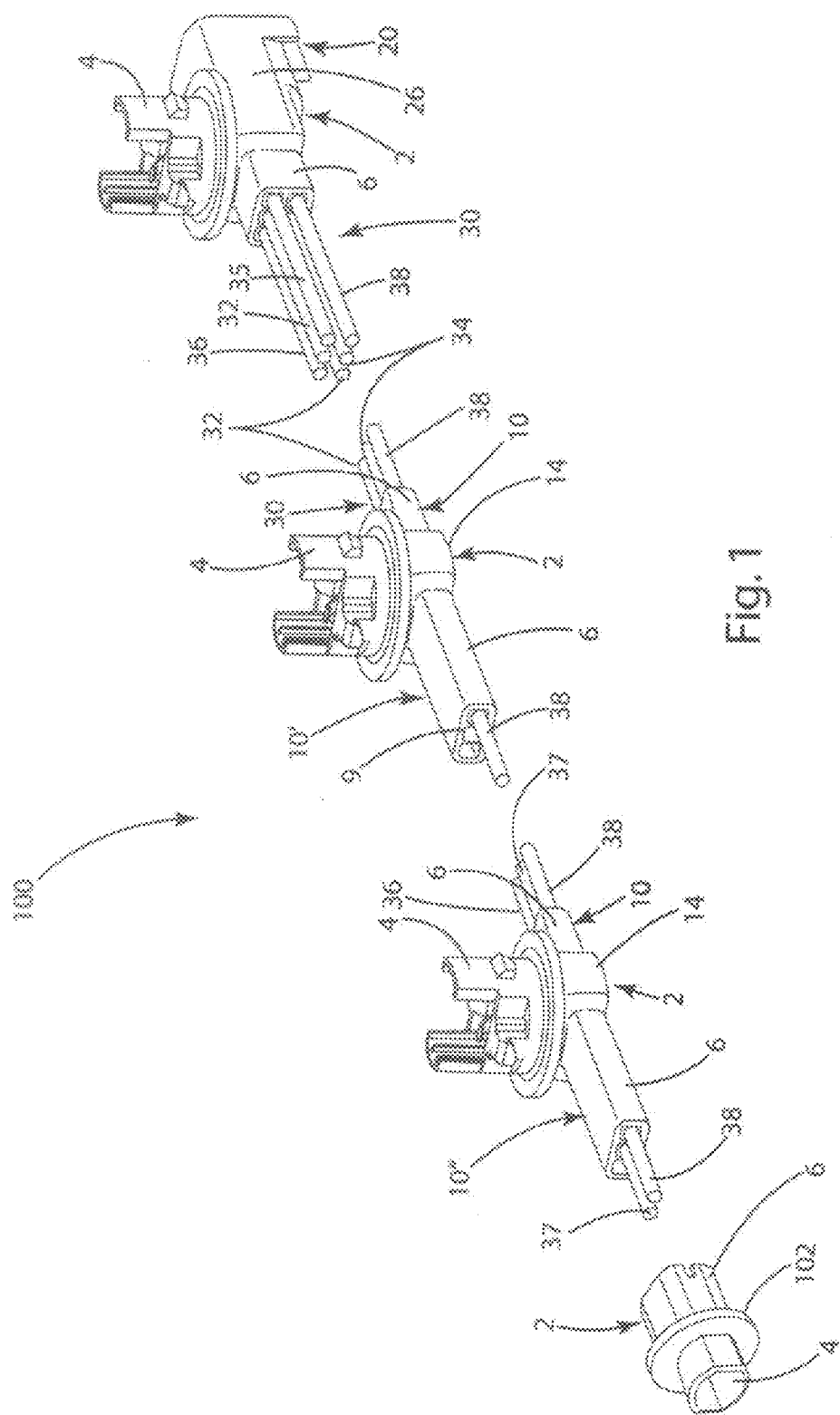
FIG. 1 shows an exemplary perspective view of a wiring assembly for a rear automotive vehicle light.

The wiring system 100 is illustrated in FIG. 1 as including connectors 2 coupled to various wires 30. Although any type of electrical function may be performed by a connector 2, the present invention will be described as being used in a rear lighting system of an automotive vehicle with the connectors 2 including sockets 4 to receive light bulbs. However, the connectors 2 may be used for other exemplary functions such as plugging in other electrical components in a vehicle from sound system components lighting, junctions, or any other electrical component plugged into another electrical component. Also, as one skilled in the art will recognize, while the present invention is illustrated as receiving a traditional light bulb fit within a socket, other types of light bulbs may be used, including LED bulbs.

The connectors 2 are illustrated in FIG. 1 as having one of three styles of connectors. The present invention is primarily directed to the pass-through connectors 10, junction connectors 20 that pass through wires, and wiring systems 100 including pass-through connectors 10 and/or junction connectors 20. The other type of connector 2, as illustrated in FIG. 1, includes a junction terminal 102 which is similar to any other existing terminal. The junction terminal 102 is a wiring terminal that terminates the electrical function as does not pass through the wires. In each connector 2, the wires 30 are generally sealed to the connectors 2 with cable seals 6. The cable seal 6 may be formed by any known method which may include, for example, using epoxy or other sealants. The wiring system illustrated in FIG. 1 is generally directed to a subset of the main wiring assembly (not illustrated) wherein the junction socket connector 20 allows easy connection to the main wiring harness. A wiring assembly for a vehicle may include numerous junction socket connectors 20. However, one skilled in the art would easily recognize that the wiring assembly 100 may be formed without the junction socket connector 20 and instead formed with the pass-through connectors 10 as well as the terminal connector 102 or with just pass-through connectors 10.

Figure 2:
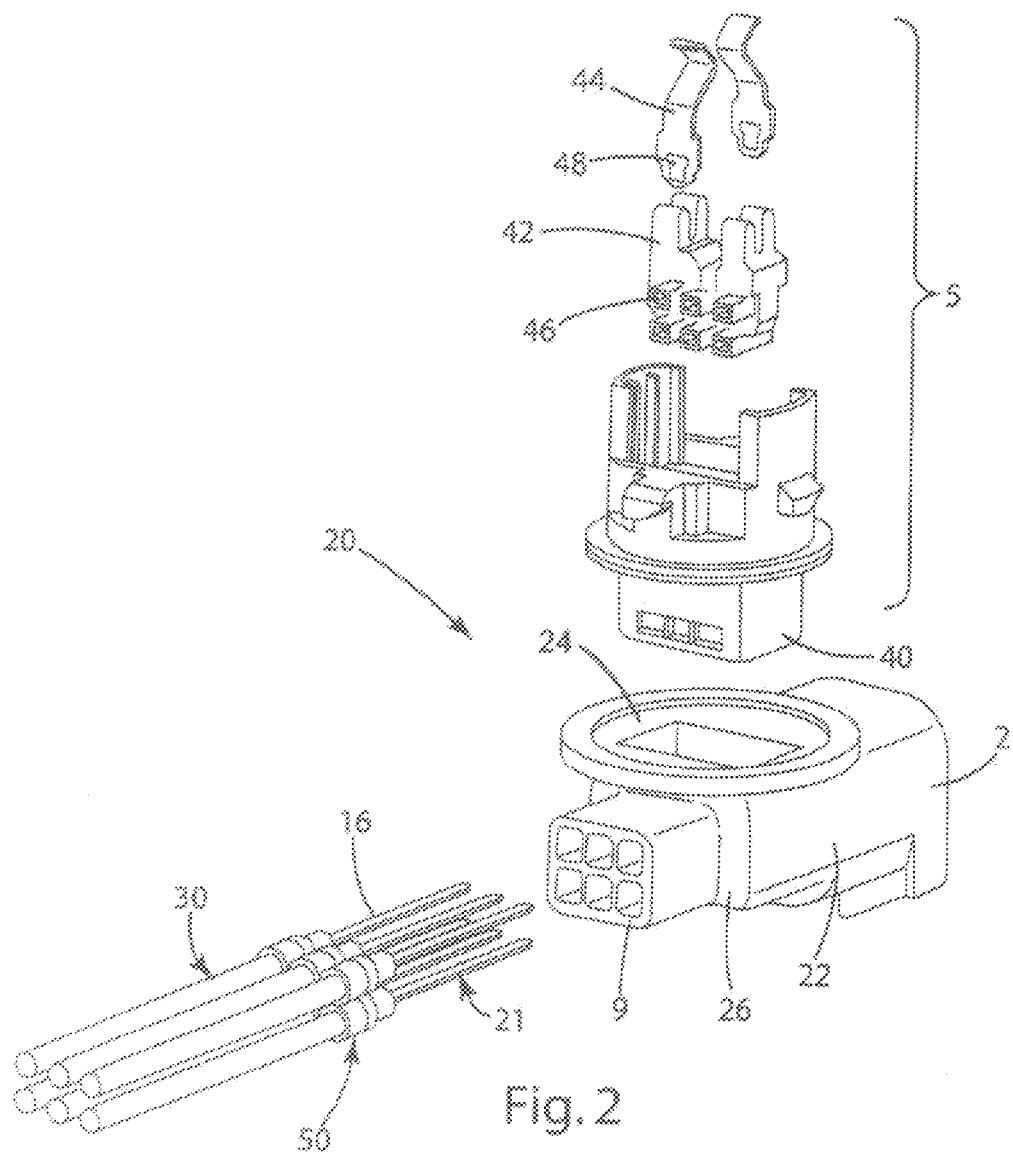
FIG. 2 shows an exploded perspective view of a junction socket connector.
Figure 3:
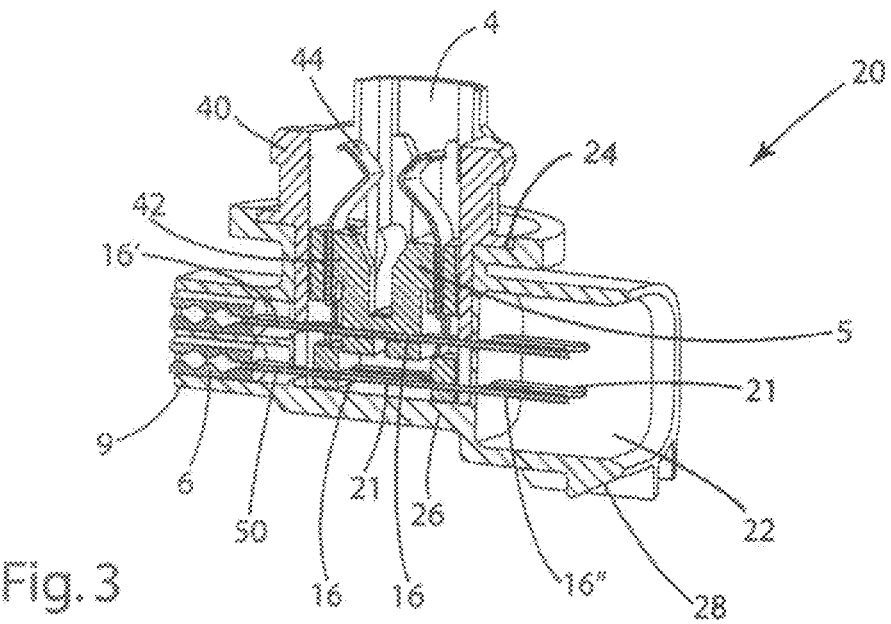
FIG. 3 shows a sectional view of a junction socket connector.

The junction socket connector 20 generally includes a main body 26 having a plug interface 22, a function interface 24, and a wire outlet or cable seal 6. The inner components of the junction socket connector 20 may vary, but generally include junction terminals 21. The junction terminals 21 have at least one end for providing an electrical connection in a plug and are generally the male or female portions of an electrical plug, which may vary in size, shape, and configuration. The junction terminals 20 are generally configured to allow easy interface with an opposing plug (not illustrated). The junction terminals 21 are illustrated in FIGS. 2 and 3 as a male pin and as further illustrated in FIG. 3, they also act as pass-through pins 16. The junction socket 20 includes junction terminals 21 as illustrated in FIG. 2. The junction terminals may connect to the wires 30 with the exemplary wire interface 50 illustrated in FIG. 2.

Figure 7:
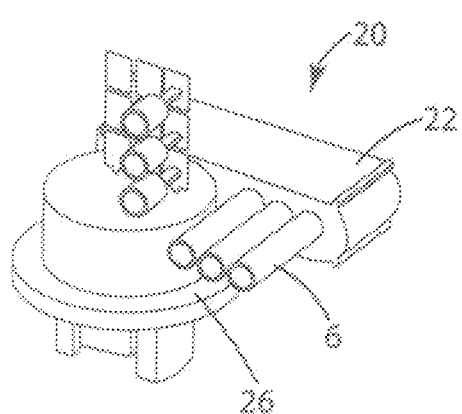
FIG. 7 shows a partial cut away view of a socket connector.
Figure 6:
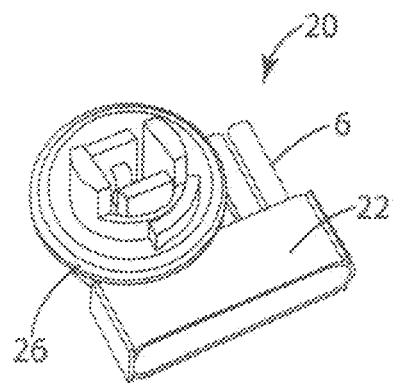
FIG. 6 shows an exemplary socket connector.
Figure 8:
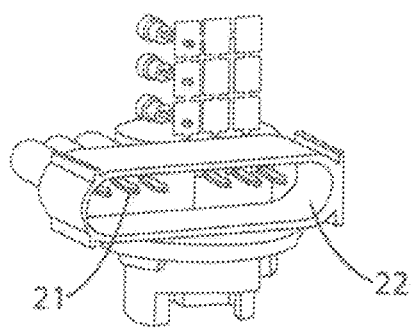
FIG. 8 shows a partial sectional view of a junction socket connector.

The function interface 24 may have any size, shape, or configuration, which may depend on the desired function. In the embodiment illustrated in the figures, for a rear taillight assembly, the function interface 24 is a cavity for receiving and retaining a socket assembly 5 for a light bulb (not illustrated). As further illustrated in FIG. 2, the socket 4 is defined by a socket assembly 5. The socket assembly 5 may be formed in any shape or configuration to fit a variety of bulbs, however, in FIG. 2 is illustrated as having a base portion 40 that interfaces with the body of the connectors 2, specifically the function interface 24. The base portion 40 may hold specific bulb retainers 42 and in some embodiments specific connector elements 44. The bulb retainers 42 may further include pass-through supports 46 which may also interface and allow easy assembly to the connector elements 44. More specifically, as illustrated in FIG. 2, the connector elements 44 include a cavity 48 which fit around the pass-through supports 46 while interfacing with the pass-through pins 16 which, as illustrated in FIG. 2, also form the junction terminals 21. An exemplary sample of the junction socket 20 in the assembled position showing the interface of the pass-through pins 16 with the connector elements 44 is further illustrated in FIG. 3. As illustrated in FIG. 3, at least one of the pass-through pins 16 acts as a function carrying pin 16' while the remaining pin identified as 16" performs only a pass-through function and does not operate any of the functional elements of the junction socket 20. The retainers 44 are illustrated as being both connected to a functional pin 16' and the ground wire 38 would be connected to the bulb through the ground pin (not illustrated) which in turn would connect (not illustrated) through the bulb retainer 42, however any method of creating an electrical circuit including one retainer attached to a functional pin 16' and the other attached to a ground pin could be used. The plug 22 may be formed in any desired shape with any number of desired junction terminals 21 while the junction socket 20 may also allow any number of pass-through pins 16 to pass through the body of the junction socket 20. The plug 22 may also include various interlock devices such as the illustrated hook 28 in FIG. 3 to enhance the connection to other wiring assemblies. The plug 22 may also include seals to prevent water and other contaminants from disrupting or interfering with the electrical connection between the plug 22 and the main connector (not illustrated) on the other wiring harness. To connect the wires 30 to the pass-through pins 16 which also act as the junction terminals 21, the wires 30 may be crimped, welded, soldered, epoxied or joined by any other means used to join two electrically conductive items between the wires 30 and the pass-through pins 16. Alternative embodiments for the junction connector are illustrated in FIGS. 6-8.

The socket connector 5 and more specifically the connector elements 44 which interface both with the bulb (not shown) and the bulb retainers 42 may be made in any desired shape. The number of functional wires used by the junction connector 20 may vary depending on the application.

The wiring assembly 100 includes at least one pass-through connector 10. Exemplary pass-through connectors 10 are illustrated in FIG. 1 and schematically illustrated along with the junction connector 20 in FIG. 1A. The exemplary embodiments of the first pass-through connector 10' and a second pass-through connector 10" are also illustrated in FIGS. 1 and 1A.

The pass-through connectors 10 are illustrated as having two cable seal areas 6 for receiving the wires 30 and sealing the wires to the body 14 of the pass-through connectors 10 as well as a functional interface 24. However, configurations having one or more cable seals may be used. For example, in some embodiments it may be desirable to pass the pass-through wires out the same side they entered, and therefore, only one cable seal area is needed. Another example of a pass-through connector having only one-cable seal is where the pass-through connectors is used as a end terminal on the wiring harness, with no exiting wires, and the cavities 9 on the cable seals 6 being epoxied to seal out water. This method allows use of standard connectors throughout the wiring harness assembly and limits the number of elements used in the assembly process. In other embodiments, such as in tight areas, areas where wires need to make a sharp bend, which may detract from longevity, or where functional wires need to be split into two directions, the connectors 10 may include two cable seals at various angles (other than the illustrated in line cable seals 6 positioned at 180 degrees relative to each other) or more than two cable seals 6. In these embodiments, the pass-through connector 10 includes at least one pin 16 that passes from cable seal area 6 to the other cable seal area 6, as illustrated in FIG. 1, or instead back to the same cable seal to exit a different cavity 9 or may split into two parts, such that the pin includes at least three ends, with each end going to a different cavity on the cable seals or even each end extending to different cable seals. Such a connector 10 is useful when wires need to go to multiple places by providing in one connector the pass-through function, the functional electrical operation and the splicing of the wires. If the pass-through connector 10 if formed with only one cable seal area 6 as described above, the pass-through pin 16 will typically have a U-shape or similar (not illustrated) with the wire 30 that passes through the pass-through connector coming out the same side as it entered, but entering and exiting in different cavities 9. The configurations of the pass-through pin 16, although not illustrated other than as a straight pass-through pin, are limitless and can include L-shapes to allow the wire 30 to exit from an adjacent side (not illustrated) or at any other desired angle. For example, in some connectors, the wires may enter the back side, and then exit all four adjacent sides, with the opposing side having the functional interface 24.

Figure 4:
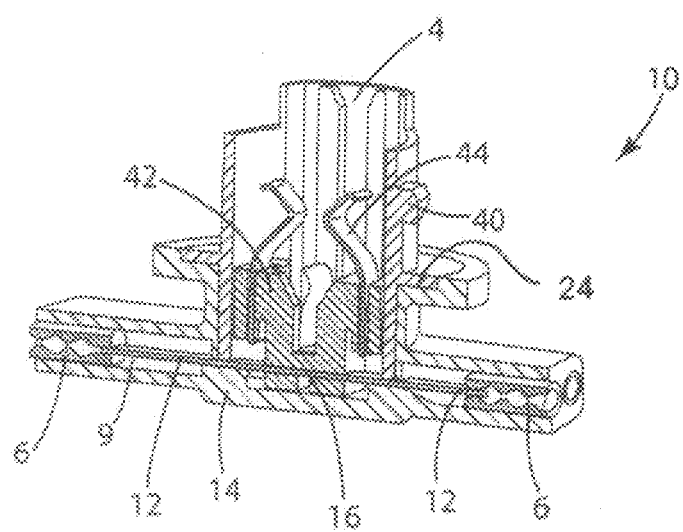
FIG. 4 shows a sectional view of a pass-through connector.
Figure 5:
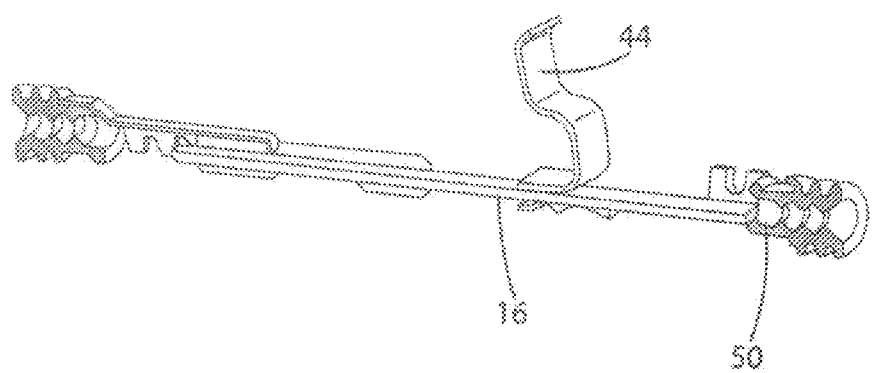
FIG. 5 shows a cut away view of a portion of a socket connector.

An exemplary pass-through pin 16 is illustrated in the sectional view of FIG. 4. A receptacle terminal 12 where the wires connect through the pass-through pin 16 is also illustrated. As with the junction connector 20, the pass-through connectors 10 include socket assemblies 5 defining sockets 4. The socket assemblies 5 also include the base portion 40 and bulb retainer 42 and connector elements 44. The connector elements 44 when assembled as part of the socket assembly 5 may be spring loaded such that they engage the pass-through pins 16 to provide an electrical connection without solder.

The pass-through connectors 10 may be formed in a variety of configurations as illustrated in FIG. 1 and FIG. 1A schematically. The first pass-through connector 10' is illustrated as receiving two function wires and a ground wire with only the ground wire 38 passing through the pass-through connector 10' while the other function wires 32 and 34 terminate within the pass-through connector 10'. The first pass-through connector 10' is illustrated as a socket for a bulb having both brake light and tail light functions such that when the lights are on for the vehicle, the tail function wire provides power to light the tail function and when the brakes are depressed the brake wire provides power to also light up the brake function. For example, the tail function may be provided by functional wire 34 while the brake function may be provided by functional wire 32. If there are no additional tail or brake functional elements located down stream from the first pass-through connector 10', these would terminate as illustrated as FIGS. 1 and 1A, with only the ground wire 38 passing through to the next functional pass-through connector or terminal connector 102. If these tail or brake functions are used by other connectors they could easily pass through the pass-through connector 10. While the cable seal 6 is illustrated as having an empty socket, other cable seals configured to a specific embodiment with only the set number of electrical outlets may be used, however it is believed that providing standard connections that are the sealed with epoxy and include no outlet wire will allow for reduced manufacturing costs.

While the pass-through connectors 10 may pass through as many wires as desired, in some instances and to reduce the number of styles or pass-through connectors used in assemblies, it may be desirable to pass some of the function and/or ground wires around some of the pass-through connectors. In the exemplary wiring assembly illustrated in FIG. 1 and schematically in FIG. 1A. The second pass-through connector 10" receives functional wires 36 and 37 from the junction connector 20 which do not pass-through the first pass-through connector 10'. However, the second pass-through connector 10" does receive the ground wire 38 from the first pass-through connector 10'. The second pass-through connector 10" may be used for any function, however, in the exemplary embodiment illustrated in FIG. 1 the second pass-through connector 10" is used as a turn signal. The second pass-through connector 10" and the functional wire 36 provide the turn signal function and, as no further turn signal functions are needed downstream, the turn signal functional wire 36 terminates in the pass-through connector. The second pass-through wire 37 passes through unaffected and does not interact with the socket assembly 5 and more specifically does not provide any functions to the second pass-through connector 10" and is electrically insulated or not in electrical contact with any items in the second pass-through connector 10" except for that the wires connect to wires 30 on each side of the pass-through pin 16. The ground wire 38 also passes through the second pass-through connector 10" and does interact with the socket assembly 5 to provide the ground function for the second pass-through connector 10". The function wire 37 and ground wire 38 further continue into the terminal connector 102. Of course it should be recognized that the wires 30 may terminate at one of the pass-through connectors 10 and no terminal connector needs to be used. However, in the exemplary wiring assembly 100 illustrated in FIG. 1 and schematically in FIG. 1A, a terminal connection 102 provides a side marker light function. The side marker light 102 receives the functional wire 37 and ground wire 38 to perform its function.

Figure 9:
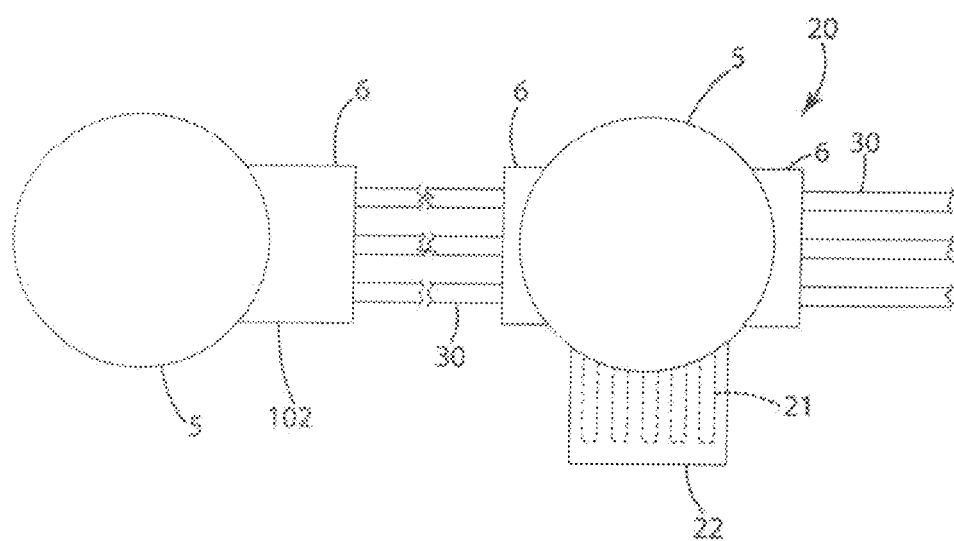
FIG. 9 shows a wiring system having a combined pass-through and junction socket connector.

As further illustrated in FIG. 9, a pass-through connector 10 may be combined with a junction connector 20. By allowing the junction connector and the pass-through connector to be combined, easy splitting of the wiring assembly may be performed thereby reducing the number of wire splices and assembly time. Pins may be used in addition to still provide the pass-through function to the junction connector.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A connector comprising:
   a body defining a socket and a first cable seal area exiting one portion of said socket and second cable seal area exiting another portion of said socket separate from said first cable seal area;
   a functional electrical assembly configured to fit within said socket
   a first pin extending from said first cable seal area to said second cable seal area;
   a second pin separate from said first pin, said second pin extending from said first cable seal area to said second cable seal area;
   a third pin separate from said first and second pins, said third pin extending from said first cable seal area to said second seal area; and
   wherein said first and second pins are in electrical communication with said functional electrical assembly and said third pin remains out of electrical communication with said functional electrical assembly.

2. The connector of claim 1 wherein said functional electrical assembly includes a bulb retainer and at least one retainer, said retainer being in electrical communication with at least one of said first and second pins.

3. The connector of claim 1 wherein said first cable seal area is opposite said second cable seal area.

4. The connector of claim 1 wherein said first cable seal area is adjacent said second cable seal area.

5. The connector of claim 1 wherein at least one of said first and second cable seal areas is a plug assembly and wherein said first and second pins each include an end forming a junction terminal situated within said plug assembly.

6. A connector comprising:
   a body defining a socket and a first and second cable seal area;
   a functional electrical assembly configured to fit within said socket
   a first pin and second pin extending from said first cable seal area to said second cable seal area; and
   wherein said first and second pins are in electrical communication with said functional electrical assembly and wherein said first pin includes at least three ends, said first end being disposed in a cavity on said first cable seal area and said second end being disposed in a cavity on said second cable seal area and wherein said connector further includes a third cable seal area and said third end is disposed within a cavity on said third cable seal area.

7. The connector of claim 6 wherein said second pin terminates within said functional electrical assembly.

8. A wiring system comprising:
   at least one junction connector having a body defining a plug, a socket for receiving a functional electrical assembly and at least one cable outlet; and
   a plurality of pins extending from said plug to said at least one cable outlet, and wherein at least one of said plurality of pins is in electrical communication with said functional electrical assembly and another of said plurality of pins remains out of electrical communication with said functional electrical assembly.

9. The wiring system of claim 8 further including a pin extending from said plug to said functional electrical assembly and wherein said pin terminates at said functional electrical assembly.

10. A wiring system comprising:
at least one junction connector having a body defining a plug, a socket for receiving a functional electrical assembly and at least one cable outlet;
a plurality of pins extending from said plug to said at least one cable outlet, and wherein at least one of said plurality of pins is in electrical communication with said functional electrical assembly; and
further including a pass-through connector having a plurality of cavities for receiving a plurality of wires and wherein said pass-through connector is in electrical communication with said junction socket and wherein said pass-through connector includes a pin extending between at least two of said plurality of cavities and wherein at least two of said pins are in electrical communication with a functional electrical assembly coupled to said pass-through connector.

11. A wiring system comprising:
at least one pass-through connector having a body with a first cable seal area having at least three cavities configured to receive wires and a socket for receiving a functional electrical assembly;
a first pin extending from a first cavity selected from said at least three cavities through said body and to a second cavity selected from said at least three cavities, and wherein said first pin is in electrical communication with said functional electrical assembly; and
a second pin extending from a third cavity selected from said at least three cavities and to said functional electrical assembly and wherein said first pin is a ground pin and said second pin is in electrical communication with said functional electrical assembly and communicates a functional signal.

12. The wiring system of claim 11 further including a second pass-through connector and wherein said second pass-through connector includes a body a cable seal area with at least three cavities configured to receive wires and a socket for receiving a functional electrical assembly and wherein one of said wires is in electrical communication is in electrical communication with said first pin and in communication with a third pin which passes from a first cavity on said second pass-through connector to a third cavity and is in electrical communication with a functional assembly on said second pass-through connector.

* * * * *